E. P. GLEASON.

Lamp-Shade Holder.

No. 8,345. Reissued July 23, 1878.

*Witnesses.*

Harry King

William H. Hicks

*Inventor*

Elliott P. Gleason by A. Sidney Drown Atty.

N. PETERS, PHOTO-LITHOGRAPHER, WASHINGTON, D. C.

UNITED STATES PATENT OFFICE.

ELLIOTT P. GLEASON, OF BROOKLYN, NEW YORK.

IMPROVEMENT IN LAMP-SHADE HOLDERS.

Specification forming part of Letters Patent No. 96,909, dated November 16, 1869; Reissue No. 8,345, dated July 23, 1878; application filed June 1, 1878.

*To all whom it may concern:*

Be it known that I, ELLIOTT P. GLEASON, of Brooklyn, Kings county, New York, did invent Improvements in the Construction of Holders for Shades and Globes of Gas and other Burners; and that the following is a full, clear, and correct description of my invention, reference being had to the accompanying drawing, making part of this specification, and to the letters of reference marked thereon, in which—

Figure 1:
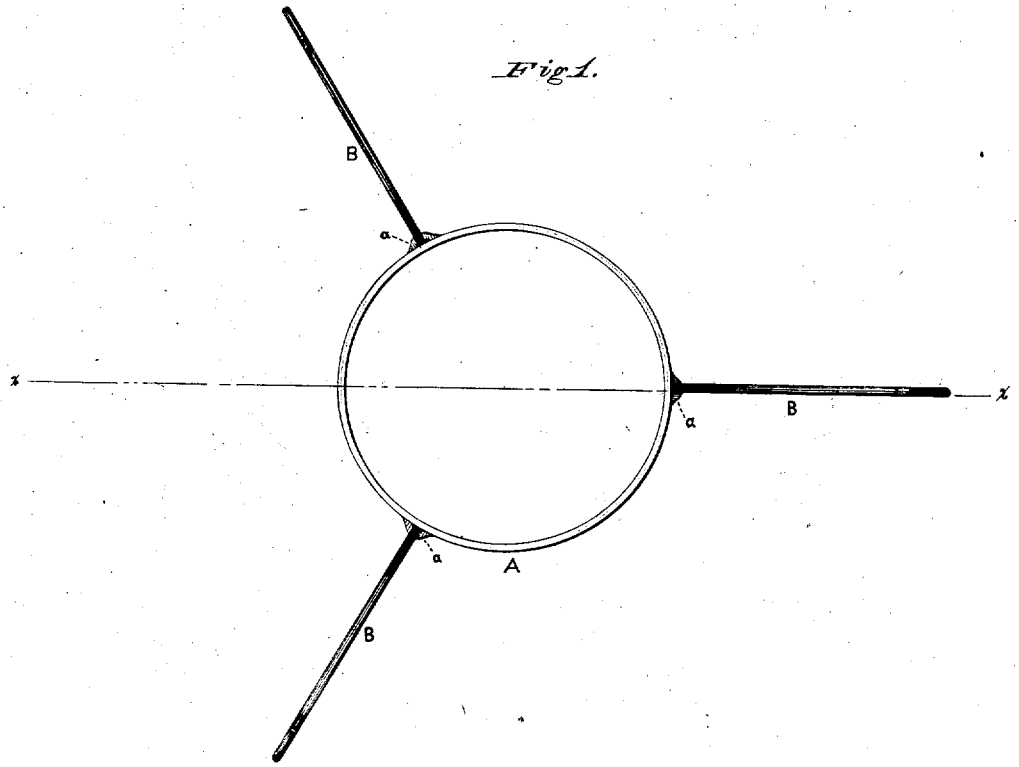
Figure 2:
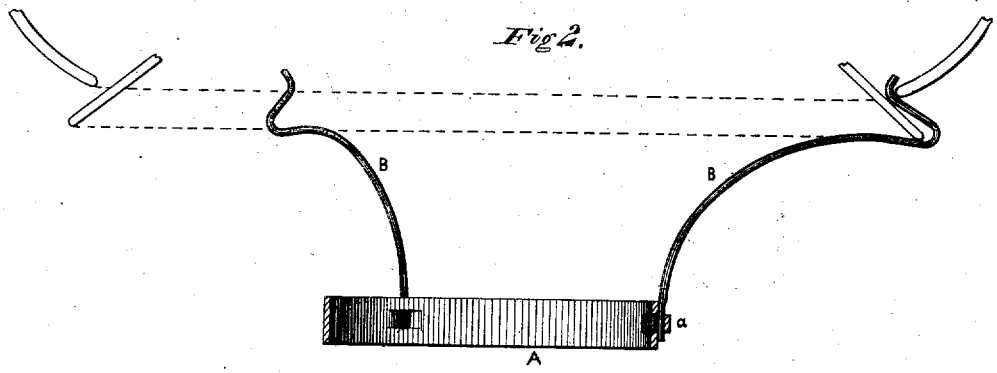

Figure 1 is a top view of my improved holder for shades and globes. Fig. 2 is a side elevation of the same.

In the drawing like parts of the invention are designated by the same letters of reference.

The nature of the present invention consists in certain improvements, as more fully hereinafter set forth, in the construction of holders for globes and shades of gas and other burners.

The nature of the present invention further consists in a globe or shade holder having elastic arms, bent or shaped in a suitable manner to yield to the expansion and contraction of the globe or shade, the ends of the arms terminating in S-shaped hooks, the object of which is to embrace the lower flange or edge of the shade or globe, retaining the latter in position without the aid of screws.

The arms accommodate themselves to the expansion and contraction of the globe or shade, and thus form a guard against the sudden breakage or fracture of the globe or shade, which is of frequent occurrence when rigid arms, or arms that will not accommodate themselves to the expansion of the globe or shade, are employed.

A large number of French globes are imported which do not have the lower neck or flange, on which a holder could be placed. Holders for these globes are resorted to having a male and female thread, which are screwed together, one piece on the outer edge and the other piece on the inner surface of the base of the globe, and when tightened firmly hold the globe between them. These holders, besides being expensive, are impracticable, for the holder must be unscrewed from the inside of the globe before the same can be removed for cleaning or other purposes.

The elastic arms which I employ in my improved holder will accommodate themselves to globes having no neck or flange, for the ends of the holes are shaped in such a manner as to hold a globe either on the inside or the outside by embracing the flange, the holder yielding to the expansion of the globe in either position.

Spring metal being used in the manufacture of the arms, the globe or shade is easily slipped in or out of position within the hooks, and held in position either on the inside or outer edge of the lower opening by the elastic force of the arms.

To enable those skilled in the arts to make and use my invention, I will describe the construction and operation of the same.

My improved shade and globe holder consists of a ring of metal, A, provided with the straps *a*, which straps I punch or stamp up, by means of a male and female die, out of the metal forming the ring A, so that they shall project beyond the face of the ring A and receive the ends of the arms supporting or intended to support the globe or shade. The arms B, for supporting the globe or shade, are, prior to being bent into the required shape, submitted to the action of dies, by which the ends of the same to be inserted within the straps are flattened upon one side, while to the opposite side a half-round formation is given, as shown in Fig. 2. The arms have their ends thus formed that when placed within the straps *a* the flat portion may bear upon the ring A, while the half-round portion accommodates itself to the incline of the strap, thus compelling the arms to retain their position, and preventing their turning or being turned after being received within the straps *a*.

The upper ends of the arms intended to support the globe or shade are curved inward and then outward, forming the S-shaped bend, as shown in Fig 2 of the drawing, so that the base of the globe or shade shall be held firmly in position. After the arms have been placed within the straps formed upon the ring, the open spaces in the ring formed by punching out the straps may be closed by solder, or in any convenient way.

It will be seen that in forming the straps out of the metal constituting the ring, economy of manufacture is secured, while the ability to manufacture is greatly increased over the old plan; and that by giving to the ends of the supporting-arms the flat and half-round formation, a more durable and superior article of manufacture is attained.

It will further be observed that by curving the arms, as shown, provision is made for the expansion of the same as the globe or shade expands from heat.

The curve shown is the one I prefer to make use of, although this feature of the invention may be varied, as may be deemed necessary or desirable.

Having now set forth my invention, what I claim as new is—

1. In a globe or shade holder for gas or other burners, the combination of the arms B, having a flattened and half-round formation, with the ring A, provided with the straps *a*, constructed substantially as and for the purposes set forth.

2. A shade-holder for gas or other burners consisting of the ring A, provided with supporting-arms B, having their outer ends bent into the particular form represented in the drawing, for the purpose of enabling them to support a shade or globe either on the inner or outer side of its lower edge or rim, all in the manner shown and described.

ELLIOTT P. GLEASON.

In presence of—

A. SIDNEY DOANE,
WILLIAM V. H. HICKS.